9,240-X
E. P. Fitzpatrick.
Grain Screen.
Patented Nov. 14, 1835.
BEST AVAILABLE COPY
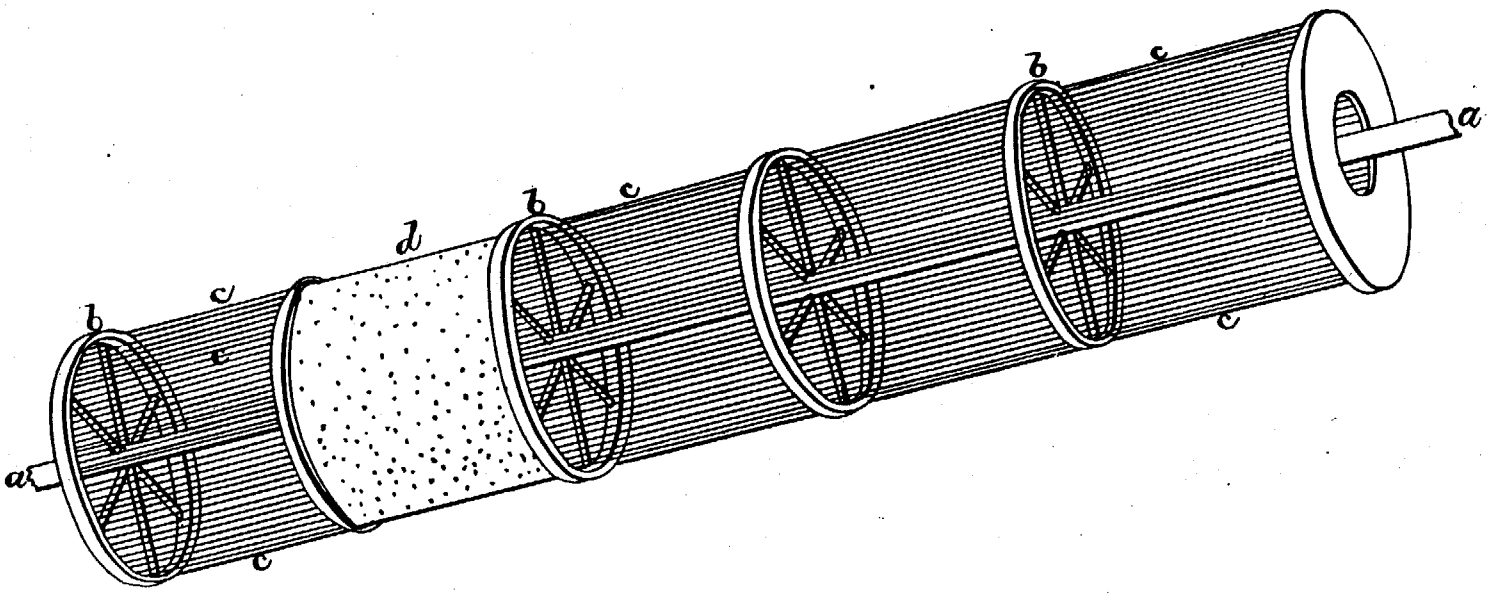
N. PETERS, PHOTO-LITHOGRAPHER, WASHINGTON, D. C.

Edward P. Fitzpatrick Mount Morris New York

Letters Patent.

The Schedule referred to in these Letters Patent and making part of the same containing a description in the words of the said Edward P. Fitzpatrick himself of his improvement in the manner of constructing the Revolving Screen for cleaning Grain &c.

To all to whom these presents shall come. Be it known that I Edward Fitzpatrick of Mount Morris in the County of Livingston and State of New York have invented a new and useful improvement in the manner of constructing the Revolving Screen for cleaning small grain such as Wheat Rye &c. and that the following is a full and exact description of the said manner of construction and of the operation thereof. also showing the difference between my principle and that of the old or woven wire covering to the screens (presenting numerous small square or oblong openings for the passage of the substances to be driven off or disposed of.)

In this plan there numerous difficulties and obstructions to the free discharge which I remedy by the application of longitudinal bars or wires to the length of the cylinder as a covering for the passage of certain substances, and round holes drilled or punched leaving no burr around them for the discharge of others. in which manner an uninterrupted egress is permitted in the direction of the length of the cylinder aided by the spiral motion obtained at the circumference from the usual inclination of the axle. — In constructing my Screens I make use of an axis of Cast iron which is to revolve and give motion to the surrounding Cylinder by means of cast heads or circles connected by arms to this axis. these circular rims are formed with grooves in the sides for the purpose of receiving the ends of the longitudinal rods intended to form the circumference. They are secured on to the axle in as many spaces and as often in number as may be found necessary according to the variety of openings I intend to form between the bars. The grooves should be of sufficient size to receive the ends of No 6 wire, which I find to answer well, and in the first or top division or space I place the ends of the long rods so close together in the groove as only to admit of the passage of dust or sand &c. to the other end of the rods is adapted the groove in the side of the circular rim which bounds the first space and in this situation they are secured by pouring into the grooves melted lead or other suitable metal which hardening around each end or rod secures them in the position given them. In the

9240X manner I proceed for three or four or as many spaces as I desire with this difference.
that the spaces are surrounded with wires set at different distances increasing in pro-
portion as for instance for seeds larger than sand &c. then for chess or cheat as it is
called. then again for small wheat and so to the next division or space. which I
adapt to cockle and such like but cover it in a different way. using a metal
covering in the sheet such as copper. which I find to answer well. or iron. This
I perforate by drilling or punching round holes. taking care to divest them of their
burr which would interrupt their passage as a smooth surface will be essential.
This perforated sheet being formed into a cylinder I secure the ends into the grooves like
the rest and proceed to the last division or space which I form of long rods again like
those first described and set sufficiently far apart to allow the good wheat to be dis-
charged between them while the stones and other larger foreign substances roll
on out at the open end terminating this space. The grain is fed into the cylinder
at an opening in the top head around the axle but which is otherwise closed.
It may be also found expedient to apply a brush to the top of the screen and five
feet will be found a serviceable length The manner of applying the power ~~[illegible]~~
and the other arrangements ^the same^ are as usual.
What I claim as my invention and not previously known or used and for which I now ask
Letters Patent is the principle of construction ~~[illegible]~~ in placing the long rods lengthwise
of the cylinder from one grooved circle to the other at proportionable distances asun-
der for the purpose above stated of separating the foreign substances from the grain
to be cleansed instead of the old mode of woven coverings forming numerous open-
ings. I do not claim any novelty of construction in the perforated cylinder
which I apply to separating the cockle
In Testimony that the above is a full description of the construction and mode
of application of the principle thereof I have hereunto set my hand this
Twenty third day of October in the year Eighteen Hundred and thir-
ty five Exd. Witnesses Edw. P. FitzPatrick
W.J.C. C. H. W. Wharton
A. D. Childs 870 [illegible]

Drawing made